UNITED STATES PATENT OFFICE.

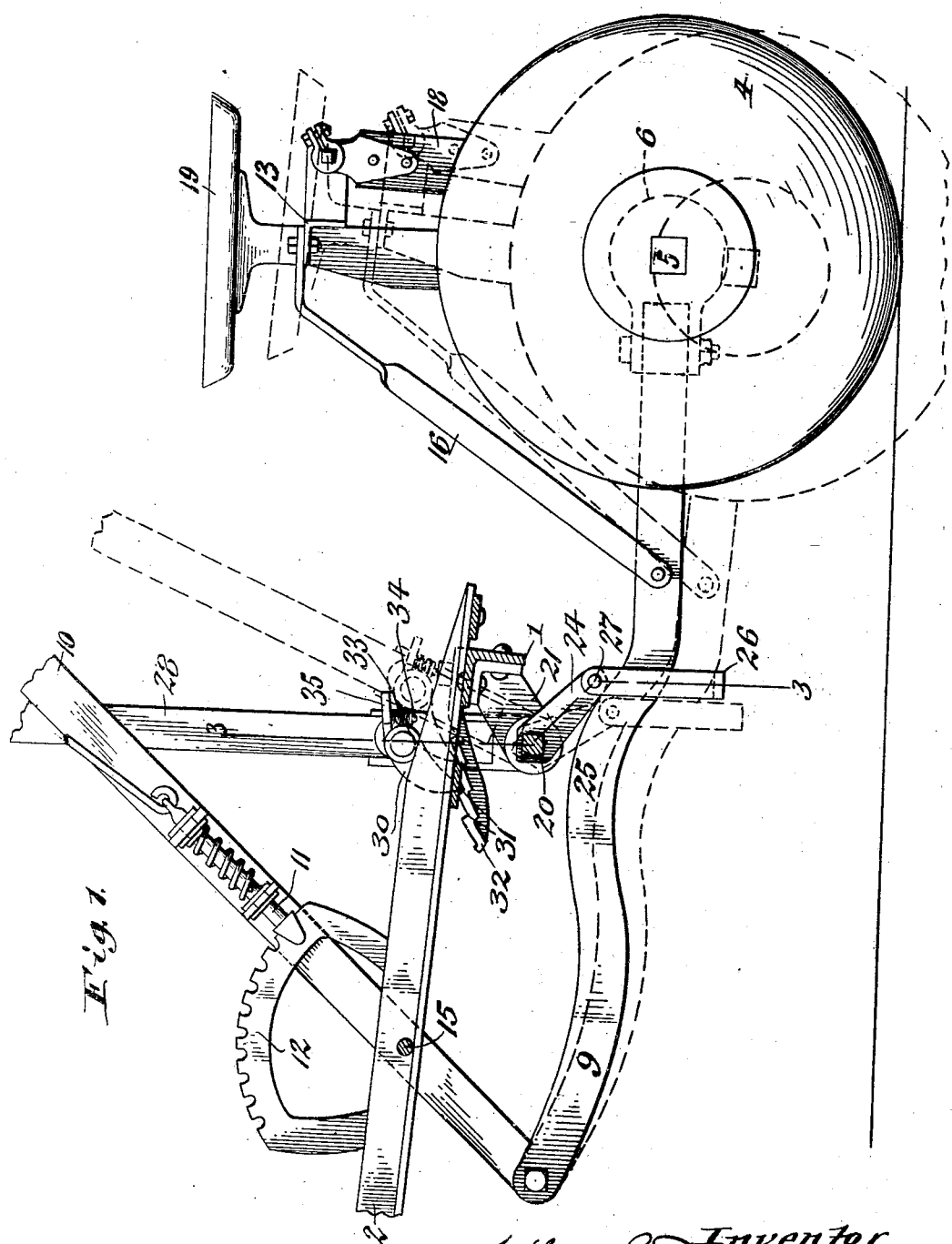

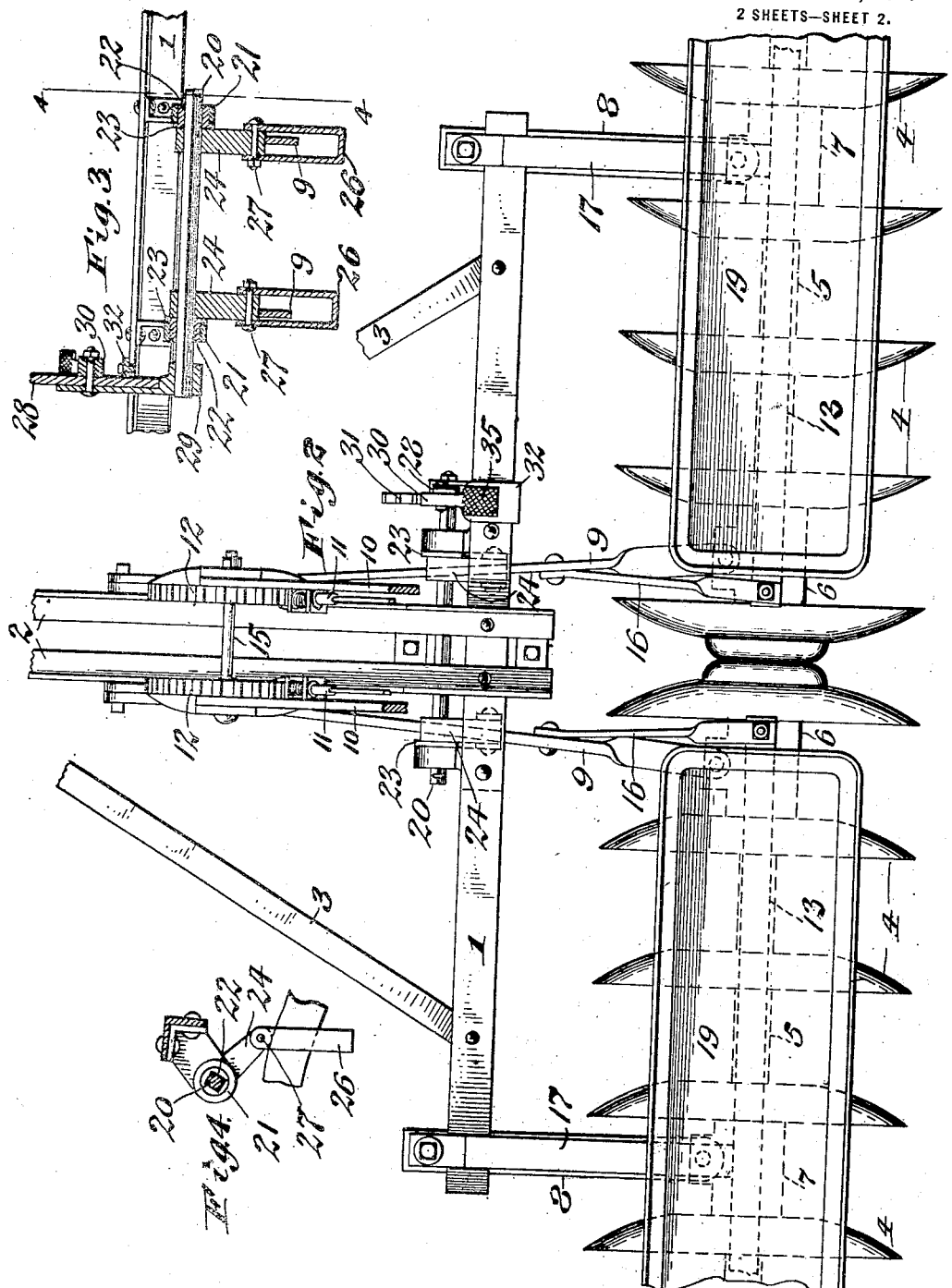

ARTHUR L. POLLARD, OF BATAVIA, NEW YORK, ASSIGNOR TO THE JOHNSTON HARVESTER COMPANY, OF BATAVIA, NEW YORK, A CORPORATION OF NEW YORK.

CENTER PRESSURE DEVICE FOR DISK HARROWS.

1,246,462.  Specification of Letters Patent.  Patented Nov. 13, 1917.

Application filed June 15, 1917. Serial No. 174,847.

*To all whom it may concern:*

Be it known that I, ARTHUR L. POLLARD, a citizen of the United States, residing at Batavia, in the county of Genesee and State of New York, have invented new and useful Improvements in Center Pressure Devices for Disk Harrows, of which the following is a specification.

This invention relates to a disk harrow and more particularly to a center pressure device for harrows of this character whereby uniform penetration of the soil may be obtained regardless of whether the harrow is passing over even or uneven ground.

It is the object of this invention to provide a device of this character which is comparatively simple and inexpensive in construction, easily operable and capable of holding the inner ends of the gangs of disks in the proper position so as to insure effective working of the same and also to prevent the bumper at the inner end of one gang of disks from climbing upon the bumper at the inner end of the other gang and wearing themselves unduly as is liable in disk harrows as heretofore constructed.

In the accompanying drawings:

Figure 1 is a vertical longitudinal section of a disk harrow equipped with my improved center pressure device, the section being taken centrally through the machine between the opposing ends of the two gangs of disks. Fig. 2 is a top plan view, partly in section, and on a reduced scale, of the harrow containing my invention. Fig. 3 is a fragmentary vertical transverse section taken on line 3—3, Fig. 1. Fig. 4 is a fragmentary vertical section taken on line 4—4, Fig. 3.

Similar characters of reference indicate corresponding parts throughout the several views.

In its general construction, this harrow is similar to those heretofore in general use and comprises a draw frame and two gangs of disks which are operatively connected with the draw frame. In the preferred form of the draw frame which is shown in the drawings, the same comprises a transverse draw bar 1, a longitudinal pole 2 connected at its rear end with the central part of the draw bar and projecting forwardly therefrom and two inclined braces 3 extending forwardly from the opposite ends of the draw bar to the pole, these several parts being preferably, although not necessarily, constructed of metal in the form of angle irons which are connected together by rivets or in any other suitable manner.

4, 4, represent the two gangs of disks which are arranged in the form of two transverse rows side by side in rear of the draw frame, each gang of disks being mounted upon a transverse axle 5 which is journaled in suitable bearings 6, 7, arranged respectively adjacent to the inner and outer ends of each gang of disks. The outer bearing 7 of each axle is pivotally connected with the corresponding end of the draw bar of the draw frame by means of an outer draft bar or link 8. The inner bearing of each axle is pivotally connected with the rear end of an inner draft bar 9 which extends forwardly underneath the draft frame, the two inner draft bars of both axles being preferably arranged on opposite sides of the pole. For the purpose of adjusting the angle of the gangs of disks fore and aft to suit the work which is to be performed, each of the inner draft bars is adjustably connected at its front end to the draw frame by means of an adjusting device which may be variously constructed but in its preferred form comprises a vertically - swinging shifting lever 10 pivoted between its upper and lower arms on one side of the pole by means of a horizontal transverse pivot 15 and having its lower arm pivotally connected with the front end of the respective inner draft bar, and a spring-pressed dog 11 movably mounted on the shifting lever and adapted to engage one or another of a plurality of notches formed in a quadrant 12 mounted on the adjacent part of the pole. Upon moving the upper arm of each shifting lever forwardly, the inner end of the respective axle is moved rearwardly and upon turning the upper arm of this lever rearwardly, the axle of the respective gang of disks is moved forwardly at its inner end.

13 represents a gang bar or plank arranged transversely and horizontally above each gang of disks and provided with depending standards 14, whereby the same is connected with the bearings of the axle. This gang bar is connected at its inner and outer ends with the inner and outer draft bars by means of inner and outer inclined braces or connecting links 16, 17. On the rear part of each gang bar scrapers 18 are mounted which are adapted to engage with the concave sides of the disks and remove any dirt which may adhere thereto. On its upper side each gang bar may also be provided with a weight box 19 into which stones or other weighting material may be placed, so as to cause the disks to penetrate the ground or soil the required extent.

My improved center pressure device which is associated with the parts above described, is preferably constructed as follows:

20 represents a pressure shaft which is arranged transversely and horizontally below the rear part of the draw frame and preferably adjacent to the front side of the transverse draw bar of the same. This shaft is preferably square in cross section and journaled in two forwardly projecting bearings 21 which are arranged on the adjacent central part of the draw bar by providing two bushings or sleeves 22 each of which has a square opening or bore which receives the pressure shaft and a cylindrical or circular periphery which engages with a circular or cylindrical opening in the respective bearing 21, as shown in Figs. 2 and 4. At its inner end each of the bearing bushings is provided with an annular flange 23 which engages with the inner end of the respective bearing, thereby holding the same against outward movement. Inward movement of this bearing bushing is prevented by means of the hub of a cam 24 which is mounted on the adjacent part of the pressure shaft and bears with its lower end against the upper side of the adjacent part of the companion inner draft bar which latter is provided with an upwardly deflected or bowed portion 25 for engagement with this cam. The latter is provided in its hub with a square opening which receives the pressure shaft, so that these parts are compelled to turn together. Upon rocking this shaft in one direction or the other, its two pressure cams are rocked in unison and either depress the two inner draft bars with which the same are associated, or permit the same to rise. In order to hold each inner draft bar and its companion pressure cam in operative relation, a U-shaped guide 26 is provided for each inner draft bar and cam. This guide has its arms arranged vertically on opposite sides of the respective draft bar and cam and its cross piece arranged below this draft bar while the upper ends of its arms are pivotally connected with opposite sides of the respective cam by means of a horizontal transverse bolt 27, as shown in Figs. 1, 3 and 4.

Any suitable means may be provided for rocking the pressure shaft, those shown in the drawings being preferred and comprising an upright pressure lever 28 which has a hub 29 provided with a square opening receiving one end of the pressure shaft. Upon throwing the pressure lever rearwardly more or less, the two cams are moved downwardly and forwardly into engagement with the bow portions of the inner draft bars and thereby cause the inner ends of the gangs of disks to be depressed, while upon moving the pressure lever forwardly, the cams are moved rearwardly and upwardly and thereby permit the inner ends of the gang of disks to rise. In order to hold the inner ends of the disk gangs rigidly and positively in their depressed position to a greater or lesser extent, a detent device is provided which preferably comprises a dog 30 pivoted on the side of the pressure lever and yieldingly held in engagement with one or another of a plurality of shoulders 31 formed on the locking segment or quadrant 32 mounted on the adjacent part of the draw frame cross bar, this yielding pressure on the dog being preferably obtained by means of a spring 33 interposed between a supporting lug 34 on the pressure lever and a rearwardly-projecting tail 35 arranged on this dog. By means of this device, the pressure lever upon being moved rearwardly will be automatically locked or held in its rearward position by engagement of its dog with one of the shoulders of the locking quadrant 32, and when it is desired to release this lever preparatory to moving the same forwardly, it is only necessary to first depress the tail of this dog so as to disengage the latter from the locking quadrant.

As the pressure lever is pulled backwardly, the inner draft bars are pressed downwardly and the disks are forced into the soil while upon moving this lever forwardly, the pressure upon the disks is released and the same are permitted to rise. It is thus possible to always obtain a uniform penetration of the disks into the soil even when the harrow straddles a ridge like the ordinary back furrow, or a hollow like the usual dead furrow. In the case of a ridge or back furrow, the center pressure device is released sufficiently to allow the center of the harrow at the inner opposing ends of the gangs of disks to rise high enough in order to avoid pressing the disks into the ridge, while in the case of a hollow or dead furrow the center of the harrow at the opposing inner ends of the gangs of disks is forced downwardly so as to cut out the depressed parts of the soil or field perfectly and uniformly. When working on level ground, it is only necessary to maintain sufficient pressure on the inner ends of the gang of disks to keep the center of the harrow in such position that the same will cut the soil at the same depth as the outer ends of the gang of disks. It will thus be noted that by the use of this device the inner ends of the gangs of disks are held rigidly and positively in their proper working position so as to insure a uniform penetration of the several disks at all times. Furthermore, this center pressure device is positive in its action and will not permit the bumper on the inner end of one gang of disks to climb upon the bumper at the inner end of the other gang of disks, thereby avoiding undue wearing of these bumpers as would otherwise be the case.

Owing to the fact that this pressure device is within convenient reach of the operator, the same can be readily and easily manipulated to insure a uniform cultivation of the entire field.

My improved center depressing device can be produced at comparatively low cost and can be easily and economically applied to harrows as now generally constructed but is particularly suitable for harrows having a low frame.

I claim as my invention:

1. A disk harrow comprising a draw frame, opposing disk gangs arranged in rear of said frame and each gang having an axle and inner and outer bearings in which said axle is journaled, means for connecting said bearings with said frame comprising inner and outer draft bars connected with said inner and outer bearings, respectively, and means for depressing the inner ends of said gangs comprising a square rock shaft, bushings having square openings which receive said shaft and cylindrical peripheries, bearings which are mounted on said frame and in which said bushings are journaled, and cams engaging said inner draft bars and provided with square openings which receive said shaft.

2. A disk harrow comprising a draw frame, opposing disk gangs arranged in rear of said frame and each gang having an axle and inner and outer bearings in which said axle is journaled, means for connecting said bearings with said frame comprising inner and outer draft bars connected with said inner and outer bearings, respectively, and means for depressing the inner ends of said gangs comprising a square rock shaft, bushings having square openings which receive said shaft and cylindrical peripheries, bearings which are mounted on said frame and in which said bushings are journaled, and cams engaging said inner draft bars and provided with square openings which receive said shaft, said bushings being provided with annular flanges between said bearings and said cams.

3. A disk harrow comprising a draw frame, opposing disk gangs arranged in rear of said frame and each gang having an axle and inner and outer bearings in which said axle is journaled, means for connecting said bearings with said frame comprising inner and outer draft bars connected with said inner and outer bearings, respectively, and means for depressing the inner ends of said gangs comprising a rock shaft journaled on said frame, cams arranged on said shaft and engaging said inner draft bars, and guides arranged on said cams and embracing said inner draft bars.

4. A disk harrow comprising a draw frame, opposing disk gangs arranged in rear of said frame and each gang having an axle and inner and outer bearings in which said axle is journaled, means for connecting said bearings with said frame comprising inner and outer draft bars connected with said inner and outer bearings, respectively, and means for depressing the inner ends of said gangs comprising a rock shaft journaled on said frame, cams arranged on said shaft and engaging said inner draft bars, and guides arranged on said cams and embracing said inner draft bars, each of said guides being of U-shape and having a cross bar arranged below the respective inner draft bar and two arms projecting upwardly from said cross bar on opposite sides of said draft bar and connected at their upper ends with opposite sides of the respective cam.

ARTHUR L. POLLARD.

Copies of this patent may be obtained for five cents each, by addressing the "Commissioner of Patents, Washington, D. C."